United States Patent [19]
Kenworthy

[11] 4,027,773
[45] June 7, 1977

[54] BALED HAY LOADING AND TRANSPORT DEVICE

[76] Inventor: John B. Kenworthy, R.R. 4, Ottumwa, Iowa 52501

[22] Filed: Nov. 11, 1975

[21] Appl. No.: 631,147

[52] U.S. Cl. .......................... 214/766; 214/701 R; 214/DIG. 4
[51] Int. Cl.² .......................................... B60P 1/00
[58] Field of Search .............. 214/766, 768, 130 C, 214/772, 701 R, 701 Q, DIG. 1, DIG. 3, DIG. 4; 172/439, 445, 448; 180/53 C

[56] References Cited
UNITED STATES PATENTS

| | | | |
|---|---|---|---|
| 2,583,830 | 1/1952 | Goble | 172/445 X |
| 2,628,730 | 2/1953 | Speicher et al. | 214/766 |
| 3,086,670 | 4/1963 | Cuendet | 214/701 R |
| 3,191,788 | 6/1965 | Hopfeld | 214/701 R |
| 3,198,357 | 8/1965 | Shelby | 214/766 |
| 3,880,305 | 4/1975 | Van Polen | 214/147 G |
| 3,934,726 | 1/1976 | Martin | 214/147 R X |

*Primary Examiner*—L. J. Paperner
*Attorney, Agent, or Firm*—Zarley, McKee, Thomte, Voorhees & Sease

[57] ABSTRACT

A hay carrying pivotal arm is pivotally connected to a frame carried on the lift arms and stabilizer arm of a tractor having a three-point hitch. A lifting lever arm is connected to the hay-carrying arm and extends in the opposite direction with an anchor chain being connected to the drawbar of the tractor such that as the frame is raised by operation of the tractor lift arms the hay-carrying arm will be caused to pivot upwardly.

7 Claims, 6 Drawing Figures

U.S. Patent  June 7, 1977  4,027,773

BALED HAY LOADING AND TRANSPORT DEVICE

BACKGROUND OF THE INVENTION

Bale handling machines heretofore have only had the capability of transporting a bale of hay from one location to another. Accordingly, what these machines lacked is the capability of raising and lowering the bale of hay sufficiently to load and unload from trailers, wagons, trucks and the like. Operation of a conventional three-point hitch will not raise a bale of hay sufficiently to satisfy this objective.

SUMMARY OF THE INVENTION

The baled hay loading and transport device of this invention allows for automatic elevating of a bale of hay substantially beyond that ordinarily possible by operation of the lift arms in a three-point hitch on a tractor. No separate hydraulic cylinder for operating the hay-carrying arm is required. The pivoting of the hay-carrying arm is accomplished by merely providing the hay-carrying arm with a lifting lever arm which is anchored to the drawbar by a chain such that as the frame is raised the hay-carrying arm is automatically pivoted upwardly due to the fact that the lifting lever arm is held stationary at its outer end.

DETAILED DESCRIPTION OF THE INVENTION

Figures 1, 2:
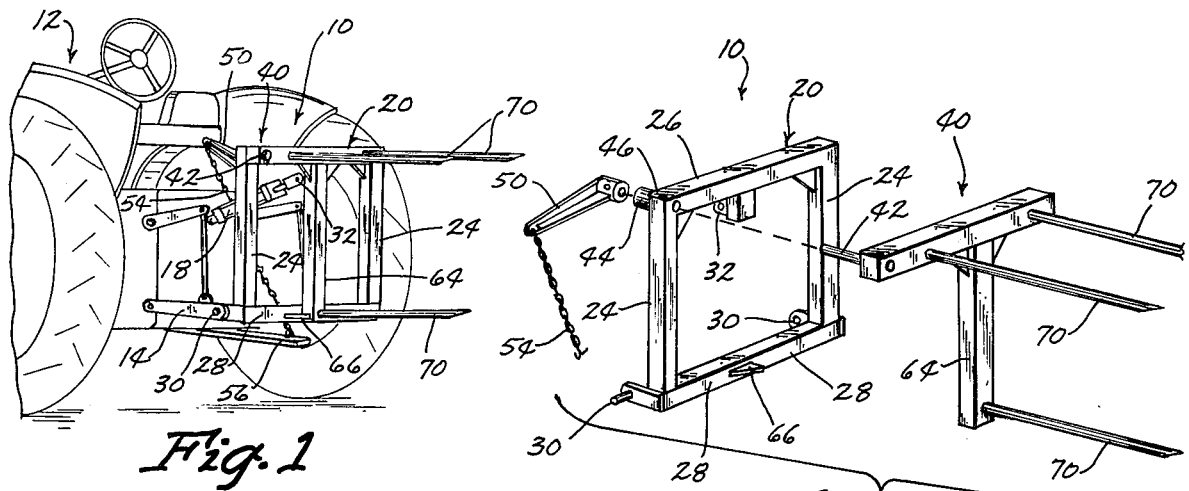
FIG. 1 is a rear perspective view of the baled hay loading and transport device.
FIG. 2 is a exploded perspective view thereof without the tractor.

The baled hay loading and transport device of this invention is referred to in FIG. 1 by the reference numeral 10 and is shown mounted on a tractor 12 having lower lift arms 14 and an upper hydraulic stabilizer arm 18.

The loading and transport device 10, as shown in FIG. 2, includes a square frame 20 having vertical side members 24 and a top cross member 26 opposite a bottom cross member 28. Pivot mounting pins 30 are provided on opposite ends of the bottom cross member 28 and are connected to the bottom lift arm 14 on the tractor 12. The stabilizer hydraulic cylinder 18 is connected to a mounting bracket 32 carried on the top cross frame member 26.

A hay-carrying pivotal arm 40 includes a pivot pin 42 received in a sleeve 44 at a corner 46 of the frame 20. The pin 42 on the side opposite the hay-carrying arm 40 is locked to a lifting lever arm 50 extending in substantially the opposite direction of the hay-carrying arm 40. An anchoring chain 54 is connected to the outer free end of the lifting lever 50 and is connected to the drawbar 56 of the tractor 12.

The T-shaped hay-carrying arm includes a downwardly extending vertical arm portion 64 positioned to engage a stop 66 on the bottom cross frame member 28 to limit downward travel of the hay-carrying arm 40. Three hay-engaging fingers 70 are provided on the hay-carrying arm 40 and arranged in a triangular relationship to positively engage and hold a bale of hay 80.

Figures 3, 4:
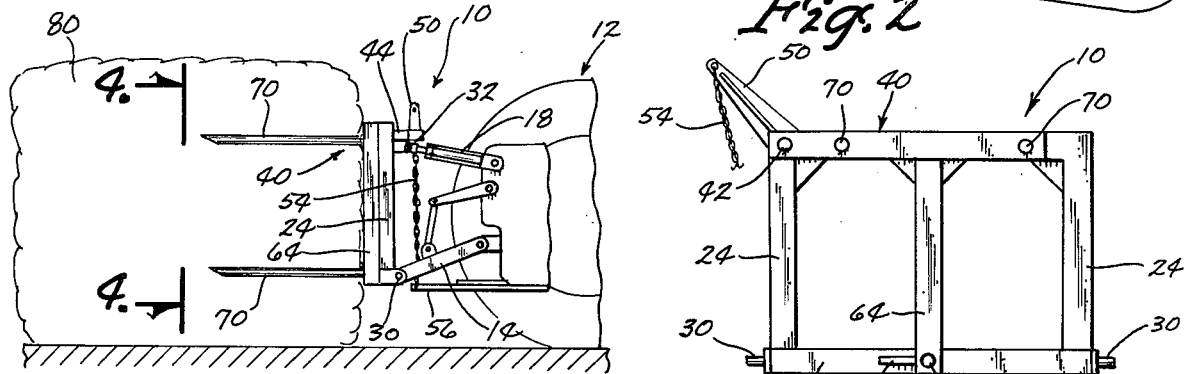
FIG. 3 is a fragmentary side elevation view of the device loading a bale of hay on the ground.
FIG. 4 is a end elevation view taken along line 4—4 in FIG. 3.
Figure 5:
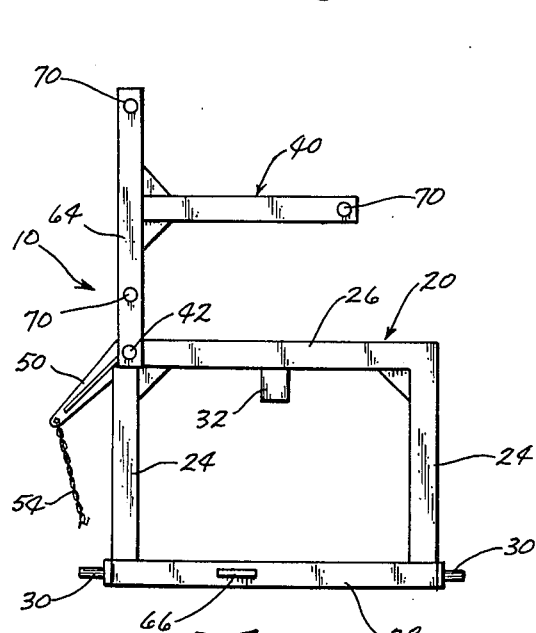
FIG. 5 is a view similar to FIG. 4 but showing the hay-carrying arm in its raised position.
Figure 6:
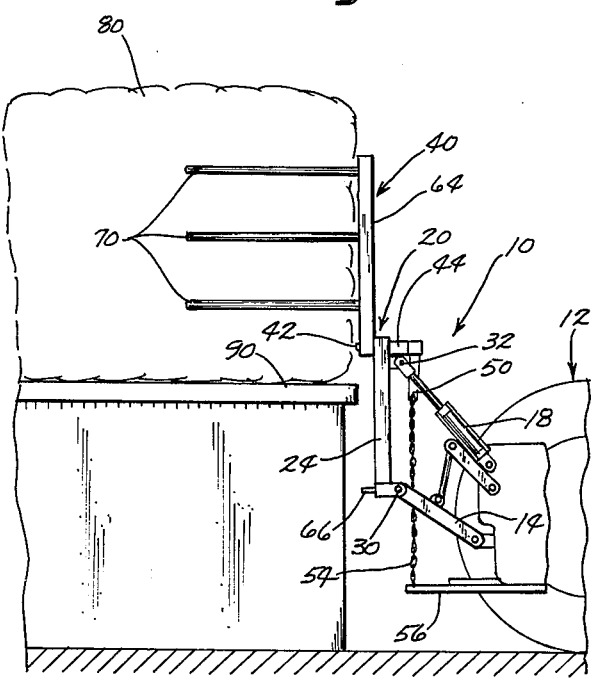
FIG. 6 is a view similar to FIG. 3 but showing the device in its raised position for unloading the bale onto an elevated platform.

Thus it is seen in operation the bale of hay 80 is backed into as it sits on the ground thus engaging the finger 70 into the center of the bale. If the bale is only to be transported the lifting arms 14 may be raised such that the bale is off of the ground. The angular displacement of the bale may be selectively varied by operation of the hydraulic stabilizer cylinder 18. If the bale 80 is to be loaded on an elevated surface 90, as seen in FIG. 6, operation of the lift arms 14 alone would be insufficient but working in combination with the structure of this invention it is seen that the hay-carrying arm 40 is automatically pivoted upwardly to the position of FIGS. 5 and 6 by the outer end of the lifting lever arm 50 remaining stationary and thereby causing the hay-carrying arm 40 to pivot upwardly. When the frame 20 is lowered through lowering of the lifting arms 14 the hay-carrying arm 40 will also pivot downwardly and return to its lowered position of FIG. 4. It is thus seen that a simple device requiring few parts is capable of automatically raising and lowering the bale of hay through mere operation of the lift arms on a threepoint hitch with a maximum elevation reachable being far in excess of that possible utilizing only the lift arms without the pivotal hay-carrying arm 40 being pivoted as the device is raised.

I claim:

1. A baled hay handling device comprising,
    a frame having mounting means for connection to tractor lifting and stabilizer arms,
    a hay-carrying arm pivotally connected to said frame for pivotal movement in a plane parallel to said frame,
    a trio of hay-engaging fingers on said hay-carrying arm extending perpendicular to said arm and spaced in triangular relationship,
    a lifting lever arm connected to said hay-carrying arm at said pivot to said frame and extending in substantially the opposite direction whereby a downward force applied to said lifting lever arm will cause said hay-carrying arm to be pivoted upwardly, and
    said hay-carrying arm including a perpendicular downwardly extending portion intermediate the ends of said arm whereby said hay-carrying arm is T-shaped and said fingers are positioned on opposite ends of said hay-carrying arm and at the outer end of said arm portion.

2. The structure of claim 1 wherein a stop is provided on said frame to limit downward pivotal movement of said hay-carrying arm.

3. The structure of claim 1 wherein said mounting means are further defined as being a pair of lift arms connected to said frame mounting means and a stabilizer arm connected to said frame in vertical spaced relation to said lift arms, and said stabilizer arm is a hydraulic cylinder for varying the angle of said frame relative to a vertical plane.

4. The structure of claim 1 wherein a chain means is connected to said lifting lever arm for connection to a stationary point on a tractor whereby upon said frame being raised by lifting arms on a tractor said hay-carrying arm will pivot upwardly.

5. A baled hay handling machine comprising, a tractor having a pair of lift arms and a stabilizer arm, a transversely positioned upstanding frame having mounting means connected to said lift arms and said stabilizer arm, a hay-carrying arm pivotally connected to said frame for pivotal movement in a plane parallel to said frame, a trio of hay-engaging fingers on said hay-carrying arm extending perpendicular to said arm and spaced in triangular relationship, a lifting lever arm connected to said hay-carrying arm at said pivot to said frame and extending in substantially the opposite direction, said hay-carrying arm including a perpendicular downwardly extending portion intermediate the ends of said arm whereby said hay-carrying arm is T-shaped and said fingers are positioned on opposite ends of said hay-carrying arm and at the outer end of said arm portion, and a chain means extending between said lifting lever arm and a stationary point on said tractor whereby upon said frame being raised by said lifting arms on said tractor said chain applies a downward force on said lifting lever arm causing said hay-carrying arm to be pivoted upwardly.

6. The structure of claim 5 wherein said chain is connected to a drawbar on said tractor.

7. The structure of claim 6 wherein said stabilizer arm is further defined as a hydraulic cylinder for varying the angle of said frame relative to a vertical plane.

* * * * *